United States Patent
Matrosov et al.

(10) Patent No.: US 12,236,262 B1
(45) Date of Patent: Feb. 25, 2025

(54) MACHINE LEARNING TECHNIQUE FOR EFFICIENTLY SCHEDULING TASKS FOR LARGE-SCALE ANALYSIS OF BINARY EXECUTABLES

(71) Applicant: Binarly Inc, Santa Monica, CA (US)

(72) Inventors: Alexander Matrosov, Santa Monica, CA (US); Sam Lloyd Thomas, Birmingham (GB); Yegor Vasilenko, Cambridge (GB); Lukas Seidel, Berlin (DE)

(73) Assignee: Binarly Inc, Santa Monica, CA (US)

( * ) Notice: Subject to any disclaimer, the term of this patent is extended or adjusted under 35 U.S.C. 154(b) by 0 days.

(21) Appl. No.: 18/905,078

(22) Filed: Oct. 2, 2024

(51) Int. Cl.
*G06F 9/48* (2006.01)
*G06F 8/75* (2018.01)
*G06F 9/50* (2006.01)

(52) U.S. Cl.
CPC ............... *G06F 9/485* (2013.01); *G06F 8/75* (2013.01); *G06F 9/5016* (2013.01)

(58) Field of Classification Search
CPC ........................................................ G06F 9/485
See application file for complete search history.

(56) References Cited

U.S. PATENT DOCUMENTS

| 2009/0150895 A1* | 6/2009 | Pullo | G06F 11/3409 718/104 |
| 2016/0036880 A1* | 2/2016 | Frett | H04L 65/80 709/224 |

* cited by examiner

*Primary Examiner* — Charlie Sun
(74) *Attorney, Agent, or Firm* — Jones Day

(57) ABSTRACT

Features are extracted and/or derived from a software package (e.g., a binary executable, etc.) which are input into a machine learning model to determine an estimated peak memory usage required to analyze the software package. A number of memory resource units required for the determined peak memory usage is then determined. If the number of available memory resource units is less than the determined number of required memory resource units, then the software package can be queue in a backoff queue. The determined number of required memory units to analyze the software package can be allocated when a number of available memory resource units equals or exceeds the determined number of required memory resource units (whether or not the software package has been queued). The software package can then be analyzed using the allocated memory units. Information characterizing this analysis can be provided to a consuming application or process.

22 Claims, 3 Drawing Sheets

MACHINE LEARNING TECHNIQUE FOR EFFICIENTLY SCHEDULING TASKS FOR LARGE-SCALE ANALYSIS OF BINARY EXECUTABLES

TECHNICAL FIELD

The subject matter described herein relates to machine learning-based techniques for more efficiently analyzing binary executables in order to determine whether they present any potential vulnerabilities which, in turn, can cause a computing system to exhibit undesired behavior.

BACKGROUND

Analysis of binary executables is critical as the transformation from source code to a binary file representation (sometimes referred to as a "binary" or an "executable") introduces a number of security risks which are often difficult to identify and otherwise assess. Malicious actors, whether through a compiler or otherwise, can covertly insert code within build systems to cause systems to exhibit undesired behavior. The increasing complexity of software packages and their interdependencies, in turn, increases the difficulty of finding vulnerabilities. Further, the process of compilation can result in other risks such as introducing new vulnerabilities or reversing security measures implemented in source code thereby exacerbating the security risks. The analysis of binary files can be computationally expensive and place burdens on overall analysis system performance especially when analyzing numerous software packages.

SUMMARY

In a first aspect, a software package (e.g., a binary executable, etc.) which is to be analyzed is received. Subsequently, features are extracted and/or derived from the software package. These features are input into a machine learning model to determine an estimated peak memory usage required to analyze the software package. The machine learning model can be trained using a dataset generated by monitoring memory usage when analyzing a plurality of different software packages. A number of memory resources required for the determined peak memory usage is then determined. If the number of available memory resource units is less than the determined number of required memory resource units, then the software package can be queue in a backoff queue. The determined number of required memory units to analyze the software package can be allocated when a number of available memory resource units equals or exceeds the determined number of required memory resource units (whether or not the software package has been queued). The software package can then be analyzed using the allocated memory units. Information characterizing this analysis can be provided to a consuming application or process.

In some variations, features are only extracted or derived from a first portion of the binary executable which can, for example, be a header of the binary executable which is parsed. This first portion can, for example, have a size less than 500 bytes, and in some cases, less than 300 bytes. The first portion can, for example, have a size less than 20% of a size of the binary executable, and in some cases, have a size less than 10% of a size of the binary executable.

The extracted or derived features in some variations include one or more of code section size, data section size, and overall binary size while in other variations, the extracted or derived features consist of code section size, data section size, and overall binary size (to the exclusion of other features).

Different types of machine learning models can be utilized including, for example, a Random Forest model.

The determined number of memory resource units can be allocated by providing a handle to a consuming application or process forming part of an analysis pipeline.

A semaphore can be employed to clamp allocated memory units to a threshold based on total available memory units.

A thread responsible for producing new software package analysis tasks can be suspended when the backoff queue reaches its capacity. The suspended thread can be resumed when memory units associated the backoff queue are replenished and space becomes available in the backoff queue.

The dataset used to train the machine learning model can be generated by intercepting memory allocation calls during analysis of each analyzed binary.

The analysis of the software package can take various forms. In one example, the analysis includes one or more of: unpacking the software package into a plurality of components, extracting, from each component, features useful in identifying the component, determining, for each component using at least one second machine learning model and based on the corresponding extracted features, a level of code similarity associated with the component, and/or providing the determined level of code similarity to a consuming application or process. The provided determined level of code similarity can be an identification of the corresponding component.

The consuming application or process can be a vulnerability database service which returns software supply chain risk information for matching components.

The analysis can also include one or more of: lifting each component into a corresponding intermediate representation and generating, for each intermediate representation, an embedding preserving code semantics from the corresponding component. At least a portion of the extracted features can be derived from the intermediate representation and the embedding.

The analysis can include one or more of: receiving a software package, unpacking the software package into a plurality of components, lifting each component into a corresponding intermediate representation, extracting or deriving features from each of the components and their corresponding intermediate representations, determining, for each component by at least one first machine learning model using the extracted or derived features, software supply chain risk for the component, providing data characterizing the determined supply chain risk for the components to a consuming application or process, generating, for each intermediate representation using at least one second machine learning model, at least one embedding preserving code semantics from the corresponding component, determining, using a component identification module and based on the at least one embedding generated for each component, an identity of such component, and/or providing data the determined component identities to the consuming application or process.

Various remediation actions can be triggered based on the analysis of the software package. Such remediation actions can prevent or other limit a computing environment executing or access the software package from behaving or operating in an undesired manner.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides machine learning-based techniques for more precisely and rapidly identifying software supply chain security risks in software packages without having access to source code.

The details of one or more variations of the subject matter described herein are set forth in the accompanying drawings and the description below. Other features and advantages of the subject matter described herein will be apparent from the description and drawings, and from the claims.

DETAILED DESCRIPTION

The subject matter described herein relates to machine learning-based techniques for allocating computational resources for the analysis of software packages such as binary executables. Such analysis can include various operations (some of which also employ machine learning) with the goal of identifying components within the software packages as well as identifying anomalous characteristics of the software packages which may cause a computing system to exhibit undesired behavior (so that corrective or remedial action can be undertaken). The machine learning models used as part of the analysis of the software package can, for example, be trained using different attributes including code sematic properties from a corpus of software packages.

Figure 1:
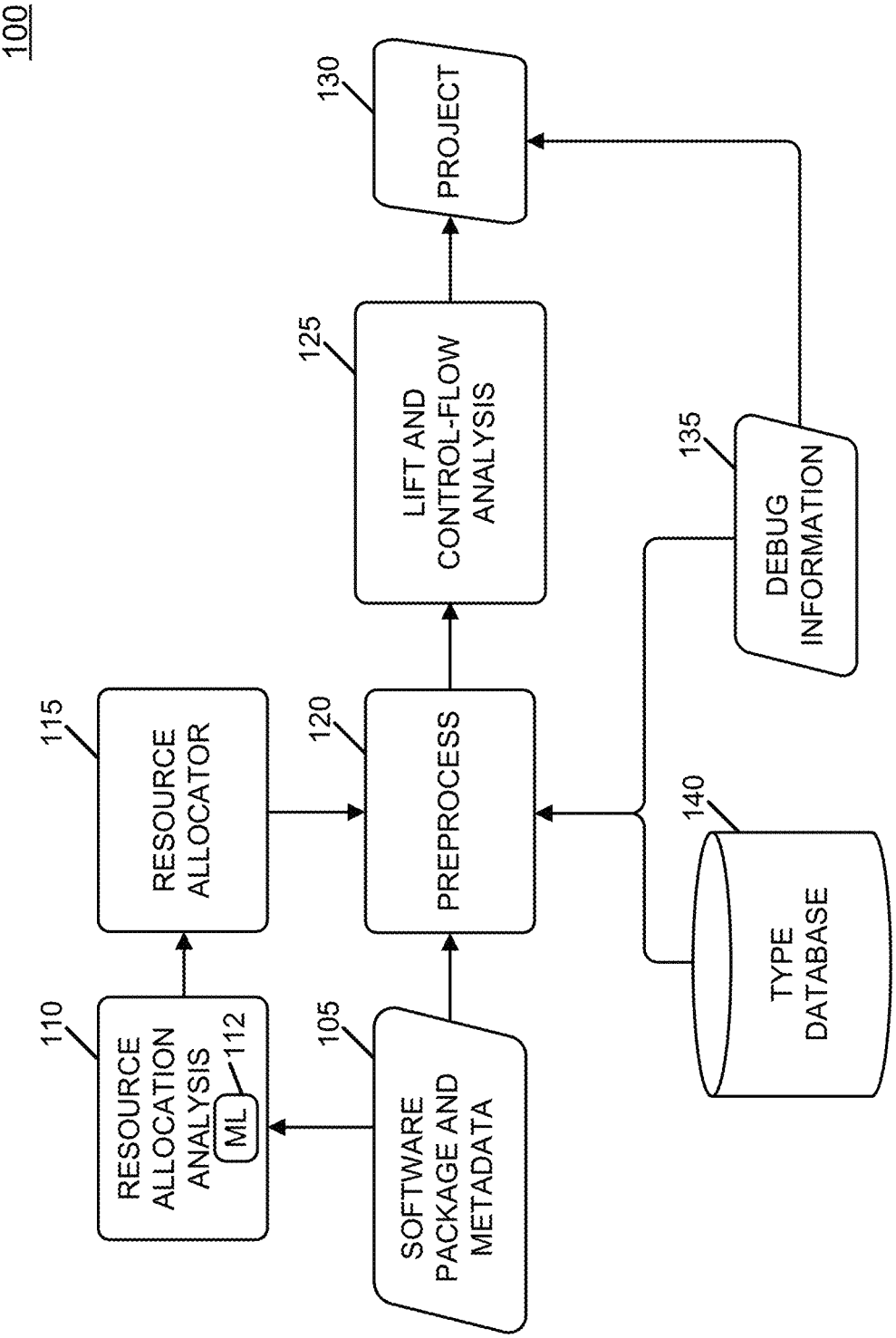
FIG. 1 is a first process flow diagram for identifying anomalous software packages or components therein using machine learning.

FIG. 1 is a diagram 100 directed to the processing and analysis of a software package. Software packages, in this context unless otherwise specified, can comprise executables, binaries, and libraries and generally can provide coordinated functionality. Initially, at 105, a software package and associated metadata is accessed or otherwise received. This software package contains a plurality of components which need to be identified or otherwise analyzed for the assessment of security vulnerabilities. A software component can be characterized as a unit of composition with contractually specified interfaces and explicit context dependencies only. Components can take varying forms such as a views, models, controllers, data access objects, services, plugins, APIs or other modules that encapsulate a set of related functions or data. Components can communicate (e.g., through function calls, etc.) with each other via corresponding interfaces.

The metadata can provide context for the software package (and its contents) including information about component creation, structure, purpose, and dependencies. The metadata can form part of the software package or comprise a separate file or series of files.

As will be described in further detail below in connection with FIG. 2, a resource allocation analysis module 110 can be conducted with regard to the software package. Further details regarding the analysis of software packages including binary executables can be found in co-pending applications U.S. patent application Ser. Nos. 18/639,784 and 18/639,805, the contents of which are hereby fully incorporated by reference. The resource allocation analysis 110 can include extracting or otherwise deriving features and inputting such features into one or more machine learning models 112 to determine an estimated peak memory usage required to analyze some or all of the software package. This estimated peak memory usage can be used by a resource allocator 115 which can determine how much memory and/or other computational resources to allocate to an analysis process.

Once the resources have been allocated by the resource allocator 115, the software package and metadata can be preprocessed, at 120, which can include unpacking/parsing the software package into the plurality of components so that they may be separately analyzed. The metadata for individual components can, in some cases, be updated to include complementary information from a type database 140 and/or a debugging database 135 which results in an annotated component. Metadata can include provide additional contextual information regarding software package components, such as the vendor, meaning of the component, dependencies on third-party code, and more.

The type database 140 can be a database such as a key-value NoSQL or graph database that stores information regarding complex types like C/C++ structures or objects. The debugging database 135 can provide alerts or fixes for known bugs associated with the particular component at the function or other level.

As used herein, the component can be at the root level with all components being rooted to the software package. The software package is the root for every component. Components are a topic of analysis and the associated data is contextualized at the software package level.

Once the component has been further contextualized, the annotated component at 125, can be lifted into an intermediate representation (IR) so that a control flow analysis can be performed (i.e., a control flow graph can be generated which defines an order of execution of functions forming part of a component, etc.). IR is the data structure or code used by a compiler or virtual machine to represent the corresponding low-level machine instructions and which can represent the operational semantics of the corresponding code. The IR may be in an intermediate language which is configured for code analyses such as determining the control flow in which individual statements, instructions or function calls of a component within the software package are executed or evaluated. The control flow analysis can be performed using an IR topology extractor which reconstructs a control flow graph and a data flow graph during the lifting phase. In particular, the lifting and control-flow extraction can be used to identify functions as well as their basic block bounds and their connectivity. The results of the lifting and control-flow extraction are used to populate a project 130 which can be a hierarchical representation of the software package analysis. The project can be characterized as an aggregator of software packages. For example, the project could be associated with a specific device type or software product and aggregate multiple builds (recompilations) or different versions of the same software packages to provide a better way of contextualization and search for the results associated with a specific entity. The information about the software package components in the project 130 can be further enriched with information from the debugging database 135 such as the application of symbol information to provide function names.

Figure 2:
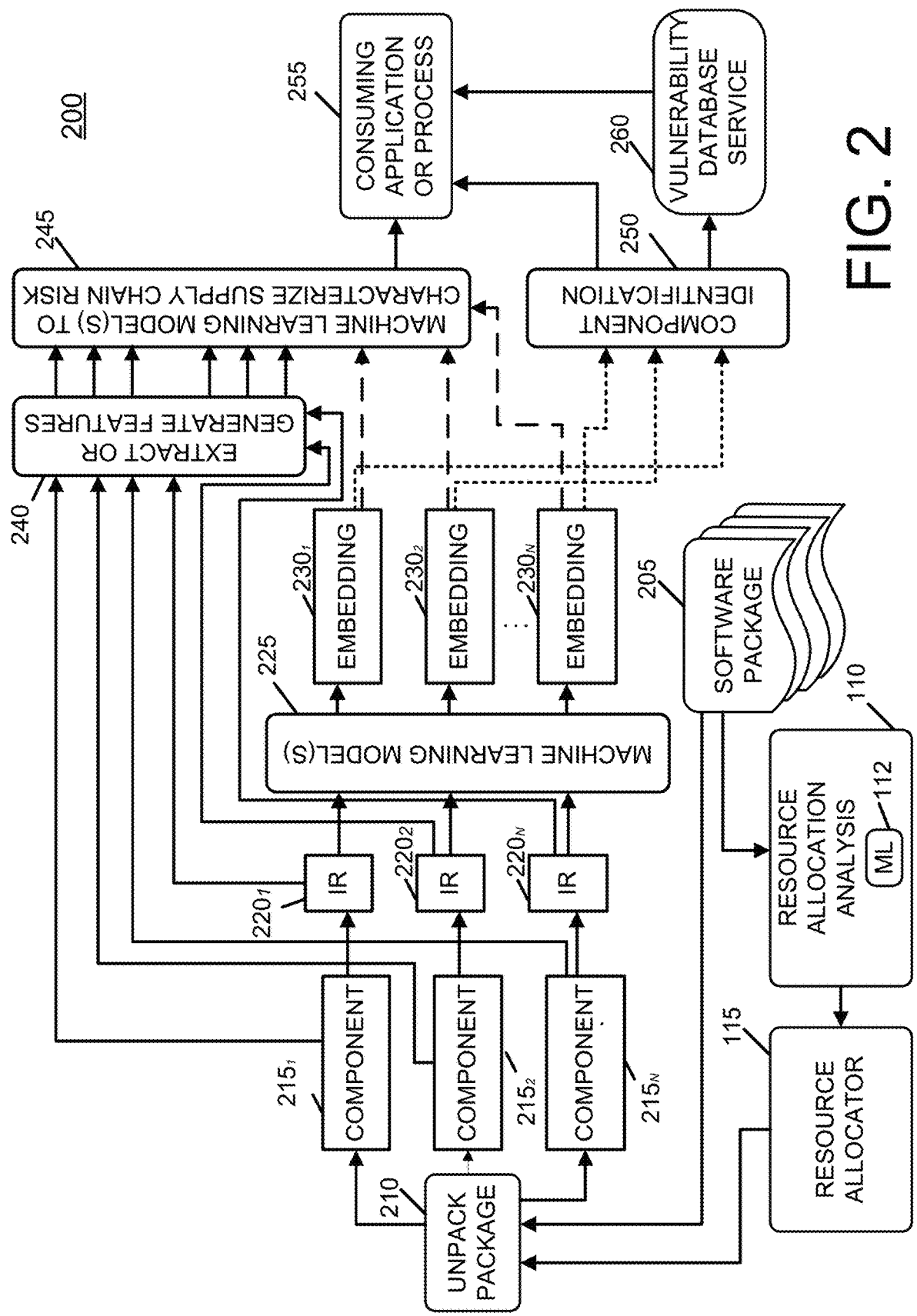
FIG. 2 is a second process flow diagram for identifying anomalous software packages or components therein using machine learning.

FIG. 2 is a diagram 200 illustrating additional detail regarding a software package analysis workflow. A queue of software packages 205 are each analyzed by a resource allocation analysis module 110 which can extract or derive features from the software package 205 as well as associated metadata. These extracted or derived features can be input or otherwise ingested by a machine learning model 112 (or an ensemble of machine learning models) in order to estimate resources required to analyze or otherwise characterize the contents (e.g., components, etc.) of the software package 205. In some cases, the estimated resources relate to memory consumption. The resource allocator 115, based on the output of the machine learning model(s) 112 can allocate certain resources (e.g., memory units, etc.) to some or all of the various analysis processes (e.g., operations 210-260 in FIG. 2).

The resource allocation analysis module can execute one or more models 112 (e.g., machine learning models, regression models, etc.) which can estimate an amount of resources required to analyze a software package and/or components of a software package (after the software package has been unpackaged 210). This estimation can be based on a machine learning model trained to estimate resource usage (e.g., memory, compute, bandwidth, etc.) responsive to certain features extracted or otherwise derived from a software package (or in other cases from a component of a software package). The machine learning model 112 can be trained, for example, using a large scale dataset generated from features extracted or derived from software packages as well as the peak memory usage by the software package while being analyzed. The software packages used to generate the training dataset included firmware and docker containers. Other features of the software packages forming part of the dataset (and extracted for inference) include aspects such as code section size, data section size, and overall software package (i.e., binary, etc.) size. The extracted features were mapped to the peak memory usage.

Referring again to the training dataset, peak memory usage of each analyzed binary in a large-scale dataset of firmware and Docker containers was determined by instrumenting the analysis environment to monitor memory consumption in real-time during execution. Specifically, the framework was modified to record the maximum amount of memory allocated by each binary throughout its analysis session. This was accomplished by periodically sampling the memory usage or by intercepting memory allocation calls, allowing for the capture of transient spikes in memory consumption. The peak memory usage data collected was then mapped to lightweight features of each binary-namely, the code section size, data section size, and overall binary size-which was extracted by examining the first few hundred bytes of the binary. This approach allowed for the creation of a dataset that linked/mapped easily obtainable binary features to their peak memory usage, facilitating the training of the machine learning/regression models.

Using the dataset, a regression model can be trained to predict the peak memory usage of analyzed software package based on the extracted features (e.g., the size of their code and data sections and overall size, etc. In some variations, the resource allocation analysis module extracts features by looking at a subset of each input software package (e.g., the first few hundred bytes, etc.) to make the feature extraction process more computationally efficient (as opposed to extracting or deriving features from the entire software package). The resource allocation model can utilize different types of machine leaning models including, for example, models based on Random Forests (RandomForestRegressor), Ridge regression, and XGBoost.

The resource allocation analysis module can use a rate limiter with a backoff queue. The rate limiter can use a semaphore-like construct that models the total available memory for analysis of software packages. When a software package 205 is scheduled for analysis, the resource allocation analysis module 110 can, by way of the machine learning model 112, predict the estimated peak memory usage for the software package. Thereafter, a number of memory units (e.g., bytes, etc.) are requested from the rate limiter's semaphore. If there are sufficient resources to process the software package 205, the resource allocator 115 provides a handle to X resource units and the total number of available resource units is reduced by X. X can correspond to the number of resource units required to handle the estimate peak memory usage for the software package 205. The analysis pipeline (e.g., operations 210-260) can use the handle to replenish the rate limiter resource pool after the input software package 205 has been analyzed by the resource allocation analysis module 110. If there are too few resource units available, then the software package 205 can be is moved into a backoff queue of a fixed size. When resource units become available, this queue is eventually emptied. If further software packages 205 are due to be analyzed after the backoff queue is full, then the thread producing new work can be put to sleep and the semaphore's notify function can be used to wake the thread up once new resources become available (i.e., allocated memory units are released back to the semaphore). In the case in which a software package 205 is estimated to consume more resources than available memory (i.e., there are no current analyses in flight, but the next task will use more than the amount of available resources), the estimate is clamped such that allocated memory units are between 1 unit and N, where N is the total available memory units.

Referring again to FIG. 2 and the operations 210-260 which can utilize the handle from the resource allocator 115, there can be a queue of software packages 205 which are each unpacked, at 210, into a plurality of components $215_1, \ldots, _N$. These components $215_1 \ldots N$ can be lifted into a respective intermediate representation (IR) $220_1, \ldots, _N$. Various techniques can be used for lifting the components $215_1, \ldots, _N$ into the IRs $220_1, \ldots, _N$. As an example, static binary translation techniques can be utilized that translate machine code instructions into IR. To lift the code to IR on the first step is to decode the machine code bytes to IR instruction. This decoding step takes raw instruction bytes, and turns them into a higher-level IR instruction.

These IRs $220_1, \ldots, _N$ can then be inputted into one or more machine learning models 225 to generate embeddings $230_1, \ldots, _N$ through one or more dimensionality reduction processes. In some cases, there is an ensemble of machine learning models generating a plurality of embeddings for each IR $220_1, \ldots, _N$. The embeddings $230_1, \ldots, _N$ can be generated using word embedding techniques which learn dense vector representations of words from IR data. The embedding process can include, as part of preprocessing, tokenizing the input and optionally performing other preprocessing. An embedding layer is generated by creating an embedding matrix to store learned word vectors after which such embedding matrix is randomly initiated with a specified dimensionality.

These embeddings can be consumed by a component identification 250 module to identify the components $215_1, \ldots, _N$. The component identification module 250 can take various forms including machine learning-based identifications (based on training of such model with embeddings corresponding to known components) or distance-based similarity analyses. In some variations, data characterizing the component identification 250 is sent directly to consuming application or process. Alternatively or in addition, a vulnerability database service 260 can be called to lookup any known risks associated with the identified components so that such information can be sent (either directly or by way of the component identification module 250) to a consuming application or process.

In a different path in FIG. 2, features can be extracted or generated, at 240 based on the components $215_1, \ldots, _N$ and the IRs $220_1, \ldots, _N$. These features, along with embeddings $230_1, \ldots, _N$ can be input into one or more machine learning models 245 which are configured and trained to characterize software supply chain risk. The one or more machine learning models 245 can comprise a multi-class classifier and/or an ensemble of models which can characterize different attributes (e.g., different risk categories) of the components $215_1, \ldots, _N$ or software package 205 The output of such one or more machine learning models 245 is provided to a consuming application or process 255.

The software package analyses can be used to determine whether or not to initiate any remediation actions which would prevent a computing environment executing or otherwise access the software package to operate in an undesired manner. For example, certain components within a software package can be deleted or modified to counter malicious or unintended operational behaviors. Further, access to the software package as a whole can be prevented or otherwise limited to counter malicious or unintended operational behaviors.

Figure 3:
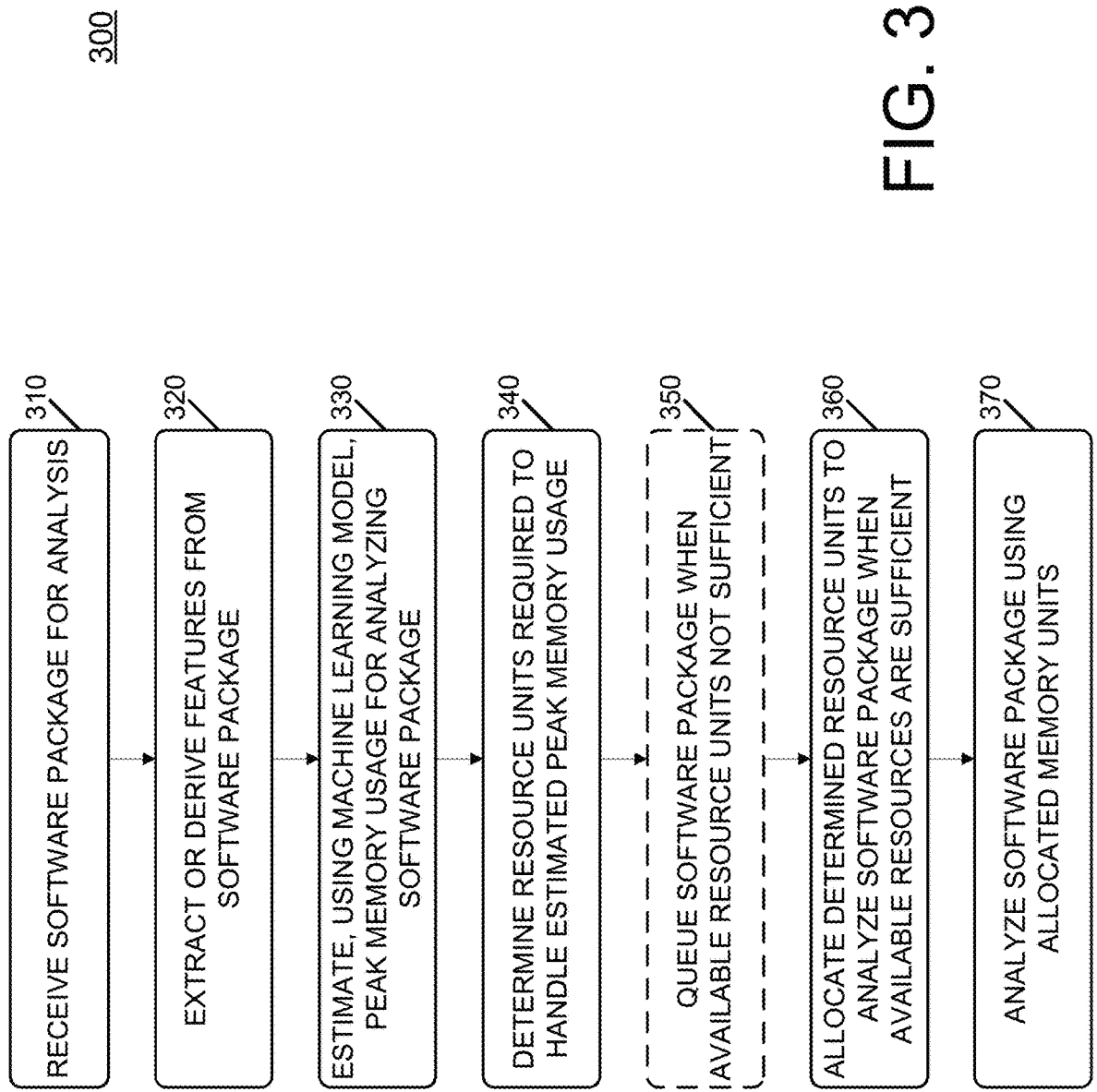
FIG. 3 is a process flow diagram illustrating a machine learning technique for efficiently scheduling tasks for large-scale analysis of software packages such as binary executables.

FIG. 3 is a process flow diagram 300 in which, at 310, a software package is received for analysis. Thereafter, at 320, features are extracted or derived from the software package. The features are then input, at 330, into a machine learning model to determine an estimated peak memory usage required to analyze the software package. This machine learning model can be trained using a dataset generated by monitoring memory usage when analyzing a plurality of different software packages. Subsequently, at 340, a number of memory resource units required to handle the determined peak memory usage is determined. When a number of available memory resource units does not exceed the determined required memory resource units, at 350, the software package can optionally be queued until such time that there are sufficient available memory resource units. When the number of available memory resource units equals or exceeds the determined memory resource units, then, at 360, the determined required memory resource units to analyze the software package are allocated. Later, the software package is analyzed, at 370, using the allocated memory units. In some cases, the allocated memory units are provided to various applications or process by way of a handle.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor (e.g., CPU, GPU, etc.), which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computing device having a display device (e.g., a LED or LCD (liquid crystal display) monitor) for displaying information to the user and a keyboard and an input device (e.g., mouse, trackball, touchpad, touchscreen, etc.) by which the user may provide input to the computing device. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for implementation by one or more computing devices comprising:
    receiving a software package for analysis;
    extracting or deriving features from the software package;
    determining, by inputting the features into a machine learning model, an estimated peak memory usage required to analyze the software package, the machine learning model being trained using a dataset generated by monitoring memory usage when analyzing a plurality of different software packages;
    determining a number of memory resource units required for the determined peak memory usage;
    queuing the software package in a backoff queue when a number of available memory resource units does not exceed the determined number of required memory resource units;
    allocating the determined required memory resource units to analyze the software package when a number of available memory resource units equals or exceeds the determined number of required memory resource units; and
    analyzing the software package using the allocated memory units.

2. The method of claim 1, wherein the software package comprises a binary executable.

3. The method of claim 2, wherein features are extracted or derived from only a first portion of the binary executable.

4. The method of claim 3, wherein the first portion of the binary executable comprises a header for the binary executable, and wherein the extracting comprises parsing the header.

5. The method of claim 3, wherein the first portion of the binary executable has a size less than 500 bytes.

6. The method of claim 3, wherein the first portion of the binary executable has a size less than 300 bytes.

7. The method of claim 3, wherein the first portion of the binary executable has a size less than 20% of a size of the binary executable.

8. The method of claim 3, wherein the first portion of the binary executable has a size less than 10% of a size of the binary executable.

9. The method of claim 1, wherein the extracted or derived features characterize one or more of code section size, data section size, and overall binary size.

10. The method of claim 1, wherein the extracted or derived features consist of: code section size, data section size, and overall binary size.

11. The method of claim 1, wherein the machine learning model comprises a Random Forest model.

12. The method of claim 1, wherein allocating the determined number of required memory resource units comprises providing a handle to a consuming application or process forming part of an analysis pipeline.

13. The method of claim 1 further comprising:
    clamping, by a semaphore, allocated memory units to a threshold based on total available memory units.

14. The method of claim 1 further comprising:
    suspending a thread responsible for producing new binary analysis tasks when the backoff queue reaches its capacity; and
    resuming the suspended thread when memory units associated the backoff queue are replenished and space becomes available in the backoff queue.

15. The method of claim 1, wherein the dataset used to train the machine learning model is generated by intercepting memory allocation calls during analysis of each analyzed binary.

16. The method of claim 1, wherein the analyzing comprises:
    unpacking the software package into a plurality of components;
    extracting, from each component, features useful in identifying the component;
    determining, for each component using at least one second machine learning model and based on the corresponding extracted features, a level of code similarity associated with the component; and
    providing the determined level of code similarity to a consuming application or process.

17. The method of claim 16, wherein the provided determined level of code similarity comprises an identification of the corresponding component.

18. The method of claim 17, wherein the consuming application or process comprises a vulnerability database service which returns software supply chain risk information for matching components.

19. The method of claim 16 further comprising:
    lifting each component into a corresponding intermediate representation;
    generating, for each intermediate representation, an embedding preserving code semantics from the corresponding component;

wherein at a least a portion of the extracted features are derived from the intermediate representation and the embedding.

20. The method of claim 1, wherein the analyzing comprises:
unpacking the software package into a plurality of components;
lifting each component into a corresponding intermediate representation;
extracting or deriving features from each of the components and their corresponding intermediate representations;
determining, for each component by at least one first machine learning model using the extracted or derived features, software supply chain risk for the component;
providing data characterizing the determined supply chain risk for the components to a consuming application or process;
generating, for each intermediate representation using at least one second machine learning model, at least one embedding preserving code semantics from the corresponding component;
determining, using a component identification module and based on the at least one embedding generated for each component, an identity of such component; and
providing data the determined component identities to the consuming application or process.

21. The method of claim 1 further comprising:
initiating at least one remediation action based on the analysis of the software package to prevent a computing environment executing or access the software package from behaving or operating in an undesired manner.

22. A system comprising:
at least one hardware processor; and
memory storing instructions, which when executed by the at least one hardware processor, result in operations comprising:
receiving a software package for analysis;
extracting or deriving features from the software package;
determining, by inputting the features into a machine learning model, an estimated peak memory usage required to analyze the software package, the machine learning model being trained using a dataset generated by monitoring memory usage when analyzing a plurality of different software packages;
determining a number of memory resource units required for the determined peak memory usage;
queuing the software package in a backoff queue when a number of available memory resource units does not exceed the determined number of required memory resource units;
allocating the determined required memory resource units to analyze the software package when a number of available memory resource units equals or exceeds the determined number of required memory resource units; and
analyzing the software package using the allocated memory units.

* * * * *